May 16, 1939. U. LAMM 2,158,289
MEANS FOR SUPPRESSING DISTURBANCES IN IONIC VALVES BY GRID CONTROL
Filed Oct. 22, 1935
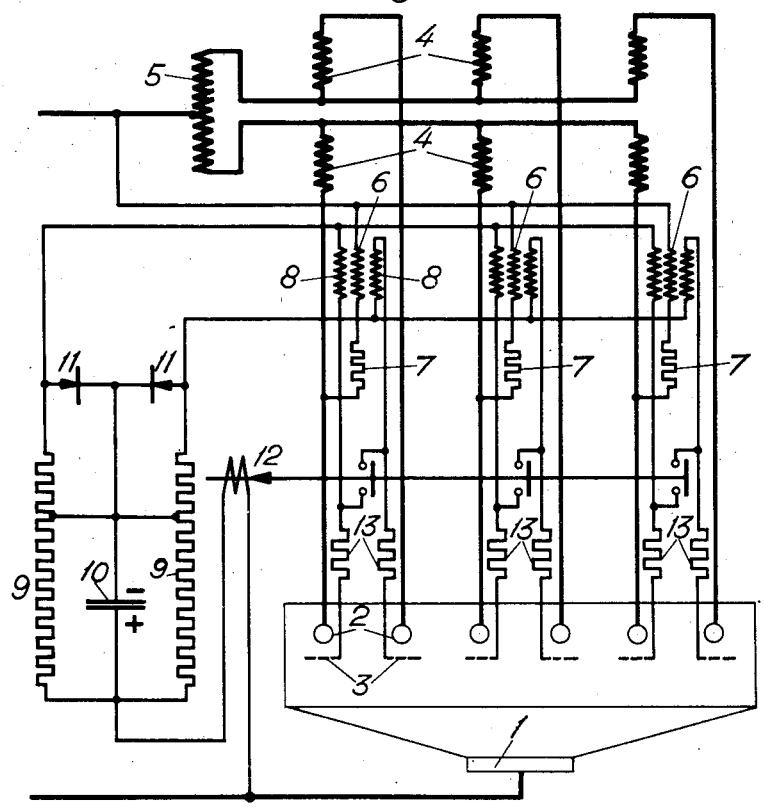
Fig.1
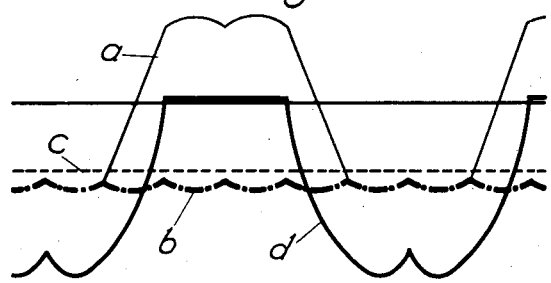
Fig.2
Fig.3
Inventor:
Uno Lamm.
per Wm Wallace White
Attorney.

Patented May 16, 1939

2,158,289

UNITED STATES PATENT OFFICE 2,158,289

MEANS FOR SUPPRESSING DISTURBANCES IN IONIC VALVES BY GRID CONTROL

Uno Lamm, Ludvika, Sweden, assignor to Allmänna Svenska Elektriska Aktiebolaget, Vasteras, Sweden, a corporation of Sweden Application October 22, 1935, Serial No. 46,112
In Sweden October 22, 1934

6 Claims. (Cl. 175—363)

A known method for suppressing disturbances in ionic valves by grid-control consists in normally keeping the grids of all inactive anodes negative (with respect to the cathode) and impressing, on the occasion of a disturbance, a negative voltage also on the remaining grids so that these will extinguish the corresponding anodes as soon as the current therethrough passes zero. It has been found that in applying so-called floating grid-control (substantially according to my pending patent application No. 679,344) the problem of obtaining such a grid blocking can be solved in a very simple manner. The manner of operation of such a grid circuit will in fact be the same as of a rectifier in which the grids form the anodes, the main cathode the cathode and the grid transformer the source of voltage, and this manner of operation is not essentially modified if a large resistance or other device is introduced between the cathode and the grid transformer neutral so as to absorb the main portion of the voltage in the circuit. If, however, in either of the said cases the voltage of the grid transformer is essentially reduced and simultaneously a sufficiently large D. C. voltage, negative towards the neutral, is introduced between the said neutral and the cathode, the "floating" operation of the grid circuit ceases, and a permanent negative potential is applied to the grids whereby the ionic valve is blocked. Such a connection forms the object of the present invention.

A form of the invention is diagrammatically shown in Fig. 1 of the accompanying drawing, while Figs. 2 and 3 show a couple of diagrams of the operation.

In Fig. 1, 1 is the cathode, 2 the anodes and 3 the anode grids of the ionic valve. The anodes are fed in a known manner from two threephase transformer windings 4, the neutrals of which are connected through an interphase transformer 5, the neutral of which in its turn forms one pole of the D. C. side (the minus pole in rectifiers). Between the last-mentioned neutral and three of the anode conductors, the three primary phases 6 of the grid transformer are connected in series with resistances 7. The grid transformer should in this form be of the shell type or provided with three separate cores, and its six secondary windings 8 are connected in two threephase stars having a neutral each, said neutrals being connected with the cathode through high-ohmic resistances 9. A condenser 10 having a rather large capacity is connected in parallel to one portion of these two resistances, the appropriate portion of this part to the whole being evident from the following. The remaining portions of the resistances are connected in parallel to small rectifiers 11, for instance dry rectifiers, which block against the normal direction of current from the cathode to the transformer neutral. Finally there is connected, between the resistances and the cathode, the coil of a relay 12, which preferably is polarized and which when energized short-circuits the grid transformer.

The arrangement described operates in the following manner, reference being had to Figs. 2 and 3. The voltage of one phase of the grid transformer in normal operation is represented by the curve $a$ of Fig. 2; it presents a certain modification of the sine wave shape for the reason that the primary voltage is composed of the voltages from the anode windings 4 and from the interphase transformer 5. The resulting D. C. voltage between the grid transformer neutral and the cathode is represented by the curve $b$ which obtains the same character as the D. C. voltage curve of a sixphase rectifier. The curve $b$ thus also represents the voltage on the resistances 9, neglecting the small voltage loss in the relay coil. If the condenser 10 is connected in parallel with such a portion of the resistances as corresponds to the proportion between the ordinate of the straight line $c$ and the minimum ordinate of the curve $b$, it will not in any way disturb the operation of the rectifier composed by the grids, in spite of its keeping the voltage constant between its terminals.

Finally, the voltage on a certain grid with respect to the cathode follows the curve $d$, which has practically the same character as the voltage between anode and cathode of a double threephase rectifier having an interphase transformer. Each grid thus automatically blocks its anode from the instant when the latter is extinguished until the instant when it is intended to be ignited again, whence no anode except that or those occasionally burning can deliver current into a back-arcing anode. The manner of operation now described can, however, not by itself prevent the succeeding anodes in the phase sequence from taking over the back current and thus causing the disturbance to continue. A complete suppression is, on the other hand, accomplished by means of the condenser 10 as is seen from the following.

When a disturbance occurs which causes a breakdown of the transformer voltage, thus either an overload (a short-circuit) or a back-arcing, the manner of operation illustrated in Fig. 3 begins. The condenser 10 maintains its voltage during some cycles, and on the negative potential c of its upper conducting layer, the strongly reduced voltages from the grid transformer windings 8 are superposed. These voltages e will in practice obtain a rather irregular character, which cannot be foreseen in detail as its depends on the course of the disturbance, but they will under no circumstances be so great as to raise the resulting voltage up to zero value. The discharge current of the condenser, which is essentially higher than and moreover oppositely directed to the previous current through the resistances 9, will moreover soon bring the relay 12 into action so that the grid transformer is short-circuited and the superposed A. C. voltages are reduced to zero. The voltage from the condenser 10 with or without the superposed A. C. voltage from the transformer is impressed on the upper end of the grid resistances 13. As long as an anode is carrying current, its grid cannot be prevented from obtaining zero potential, whence the potential difference is then consumed in the grid resistance 13 by the current drawn from the grid. As soon as the anode is extinguished, the grid will, on the contrary, obtain a negative potential and block against a renewed ignition. When all the anodes have been extinguished and the voltage on the main transformer therefore returns, the grid transformer is still kept short-circuited by the relay during a certain period, the primary voltage then being consumed in the resistances 7. In the meantime the valve paths will be deionized, the temperature will fall if it has risen too high, etc., so that the valve may again operate without disturbance.

Several modifications may be made in the arrangement illustrated within the scope of the invention. For instance, the voltage source of the grid circuit may consist of a transformer independent of the rectifier, but connected to the same network, and the lowering of the voltage on the occasion of a disturbance may entirely or in part be delivered from an overcurrent arising on the said occasion. The condenser 10 may be replaced by an independent voltage source, for instance a battery or a D. C. generator. The resetting of the relay 12 is preferably retarded so as to cause the relay to remain in its operative position even some time after the discharge current of the condenser has ceased. The relay may even be so arranged as to remain in closed position until it is reset by hand. The relay may also be replaced by an arrangement for removing by D. C. saturation the main portion of the voltage in the grid transformer, and the direct current for this purpose may be obtained by any of the methods which are else employed for impressing a D. C. voltage on the grids.

I claim as my invention:

1. An ionic valve with means for suppressing disturbances therein by grid-control, comprising a cathode, anodes, anode grids, sources of alternating current voltage connected between said grids and a point having in normal operation an effective potential the value of which is independent of the cathode and is substantially determined by the mean potential of the grids, and means for imparting to the said point, on the occasion of a disturbance, a fixed potential substantially negative with respect to the cathode.

2. An ionic valve with means for suppressing disturbances therein by grid-control, comprising a cathode, anodes, anode grids, sources of alternating current voltage connected between said grids and a point having in normal operation an effective potential the value of which is independent of the cathode and is substantially determined by the mean potential of the grids, and rectifying means connecting said point to a point having a fixed potential substantially negative with respect to the cathode, said means admitting a current only in the direction from said former to said latter point.

3. An ionic valve with means for suppressing disturbances therein by grid-control, comprising an alternating current source, a cathode, anodes, anode grids, a polyphase transformer connected with its primary winding to said alternating current source and with its secondary winding between said anode grids and a point having in normal operation an effective potential the value of which is independent of the cathode and is substantially determined by the mean potential of the grids, and means for imparting to the said point, on the occasion of a disturbance, a fixed potential substantially negative with respect to the cathode.

4. An ionic valve with means for suppressing disturbances therein by grid-control, comprising a cathode, anodes, anode grids, sources of alternating current voltage connected between said grids and one point, a high-ohmic resistance connected between said point and the cathode and being sufficient to absorb the main portion of the voltage in the circuit therebetween, a condenser connected in parallel to a portion of said resistance, and means for imparting to said point the potential of the negative terminal of said condenser during the period of at least one complete cycle on the occasion of a disturbance.

5. An ionic valve with means for suppressing disturbances therein by grid-control, comprising a cathode, anodes, anode grids, sources of alternating current voltage connected between said grids and a point having in normal operation a potential the value of which is independent of the cathode and is substantially determined by the mean potential of the grids, a current path including a source of negative voltage and relay actuating means, for connecting said point to the cathode on the occasion of a disturbance, and a relay actuated by said means for short-circuiting said sources of alternating current voltage.

6. An ionic valve with means for suppressing disturbances therein by grid-control, comprising a cathode, anodes, anode grids, sources of alternating current voltage connected between said grids and a point having in normal operation a potential substantially determined by the mean potential of the grids, means, including a condenser and a relay coil, for connecting said point to the cathode on the occasion of a disturbance, means actuated by said relay for short-circuiting said sources of alternating current voltage, and means for retarding the resetting of said relay until after the discharge of the condenser has been substantially completed.

UNO LAMM.